United States Patent [19]

Marglin

[11] Patent Number: 5,002,155
[45] Date of Patent: Mar. 26, 1991

[54] POSITIVE LUBRICATION DELIVERY SYSTEM

[75] Inventor: Andrew J. Marglin, Lloyd Neck, N.Y.

[73] Assignee: Kelmar Systems, Inc., Huntington Station, N.Y.

[21] Appl. No.: 462,614

[22] Filed: Jan. 9, 1990

[51] Int. Cl.$^5$ ............................................. F01M 9/00
[52] U.S. Cl. ................................. 184/6.12; 184/27.2; 184/37
[58] Field of Search .................. 184/6.12, 27.2, 28, 184/38.1, 37, 81, 88.1, 6

[56] References Cited

U.S. PATENT DOCUMENTS

| | | | |
|---|---|---|---|
| 762,103 | 6/1904 | Sturtevant | 184/27.2 |
| 1,176,936 | 3/1916 | Waldon | 184/6.12 |
| 1,303,290 | 12/1920 | Thevenin | 180/69.4 |
| 1,545,149 | 7/1925 | Ludwick | 184/37 |
| 1,764,783 | 6/1930 | Frappier et al. | 184/11.1 |
| 1,857,780 | 5/1932 | Frappier et al. | 242/207 |
| 1,937,019 | 11/1933 | Hamill | 184/27.2 |
| 2,069,639 | 2/1937 | Andres | 184/6.12 |
| 2,211,364 | 8/1940 | Brenkert | 184/6.12 |
| 2,229,237 | 1/1941 | Brenkert | 184/6 |
| 2,689,021 | 9/1954 | Borberg | 184/6 |
| 2,743,788 | 5/1956 | Borberg | 184/6.12 |
| 3,006,439 | 10/1961 | Molinaro | 184/6.12 |
| 3,240,137 | 3/1966 | Buck | 184/6.12 |
| 3,601,515 | 8/1971 | Pelizzoni | 184/6.12 |
| 4,358,996 | 11/1982 | Ohlsson | 101/217 |
| 4,541,510 | 9/1985 | Itoh et al. | 184/6.12 |
| 4,693,133 | 9/1987 | Tomita et al. | 184/6.12 |

*Primary Examiner*—Allen M. Ostrager
*Assistant Examiner*—Alan B. Cariaso
*Attorney, Agent, or Firm*—Amster, Rothstein & Ebenstein

[57] ABSTRACT

A positive lubrication delivery system for lubricating a rotatable gear comprises a stationary shroud configured and dimensioned to encompass a segment of the gear to be lubricated. The shroud defines with the gear segment, intermediate the circumferential outer surface of the gear segment and the adjacent surface of the shroud, a channel of diminishing clearance in the direction of gear rotation. Lubricant introduced into the channel is confined and subsequently caused to be spread over the circumferential outer surface of the gear in response to its rotation.

9 Claims, 4 Drawing Sheets

POSITIVE LUBRICATION DELIVERY SYSTEM

BACKGROUND OF THE INVENTION

The present invention relates generally to a positive lubrication delivery system for lubricating a rotatable member, and more particularly to a such a lubrication delivery system for the rotatable members of a motion picture projector.

Lubrication delivery systems for lubricating the rotatable members of a motion picture projector well known in the art. See, for example, U.S. Pat. Nos. 2,069,639; 2,689,021; and 2,743,788. When properly lubricated on a regular basis by a dedicated projectionist, the various gear trains and other rotatable members in a motion picture projector provide many years of continuous service Indeed, many of the Century 35 and mm motion picture projectors produced in the early 1950's are still currently in use. At that time however commercial projectors had duty cycles of only about 15-20 minutes per projector, with a pair of projectors being used alternately to show successive reels of the motion picture film. Accordingly, there was more than ample time for proper lubrication of the projector as required during its downtime. A dedicated projectionist was able to introduce the desired quantity lubricant into the projector while the projector was off duty in such a manner as to spread it over the outer surface of the gear train either while the gear train was stationary or by intermittently moving the gear train.

More recently, however, the reel system has been substantially replaced by a large platter system in which a film disposed on a platter is shown continuously through a single projector for a prolonged period—for example, for five to sixteen hours—without a break in the duty cycle. Furthermore, such automated systems have displaced the dedicated projectionist who was familiar with the equipment and aware of the proper lubrication procedures. As a result, motion picture projector gear trains have recently tended to periodically fail with distressing regularity. Thus there has arisen an urgent need for a lubrication delivery system which may be operated by a layman, and used even as the motion picture projector is showing a film.

Accordingly, it is an object of the present invention to provide a lubrication delivery system for lubricating a rotatable member.

Another object is to provide such a system for lubricating the rotating members of a motion picture projector.

A further object is to provide such a system for lubricating the rotatable members of a motion picture projector even while the motion picture projector is being used to project the film.

On the other hand, it is also an object of the present invention to provide such a system which can be activated even when the motion picture projector is off duty and not in operation.

It is a further object is to provide such a system which can be actuated by a layman.

SUMMARY OF THE INVENTION

It has now been found that the above and related objects of the present invention are obtained by a positive lubrication delivery system for lubricating a rotatable member. The system comprises a stationary shroud means configured and dimensioned to encompass a segment of the rotatable member to be lubricated. The shroud means defines with the rotatable member along the segment, intermediate the circumferential outer surface of the rotatable member segment and the adjacent surface of the shroud means, a channel of diminishing clearance in the direction of rotation of the rotatable member. Lubricant introduced into the channel is confined and subsequently caused to be spread over the circumferential outer surface of the rotatable member in response to its rotation. The rotatable member is typically a gear with teeth defining the circumferential outer surface of the rotatable member.

In a preferred embodiment the channel provides a maximum clearance of 0.07 inch and a minimum clearance of 0.02 inch, with the clearance diminishing at a substantially constant rate. The channel is configured and dimensioned such that lubricant introduced in sufficient quantity adjacent the point of maximum clearance, regardless of whether the rotatable member is rotating at the time of delivery, is caused to travel along the channel in the direction of normal rotation of the rotatable member toward the point of minimum clearance during normal rotation of the rotatable member The lubricant introduced into the channel is introduced at an angle normal to the direction of rotation of the rotatable member.

Preferably the shroud means includes an arcuate surface adjacent the circumferential outer surface of the rotatable member and at least one surface (preferably planar) transverse to the arcuate surface and extending over a respective end portion of the rotatable member.

The present invention also encompasses such a lubrication delivery system additionally including a source of lubricant (preferably having a penetration after 60 strokes of 240-280 mm), means secured at one end to the source and at the other end to the shroud means for transporting lubricant from the source to the channel adjacent the point of maximum clearance, and means for manually actuating the lubricant transporting means. More particularly the present invention encompasses, in combination, a motion picture projector, including a plurality of rotatable members, and the lubrication delivery system including a plurality of the shrouds and a like plurality of the lubricant transporting means. Each of the shroud means is being disposed adjacent one of the rotatable members to define one of the channels, and each of the lubricant transporting means is operatively secured at one end operatively secured at one end to a respective one of the shroud means and at the other end to the source.

BRIEF DESCRIPTION OF THE DRAWING

The above brief description, as well as further objects and features of the present invention, will be more fully understood by reference to the following detailed description of the presently preferred, albeit illustrative embodiments of the present invention when taken in conjunction with the accompanying drawing wherein.

DETAILED DESCRIPTION OF THE PREFERRED EMBODIMENTS

Figure 1B:
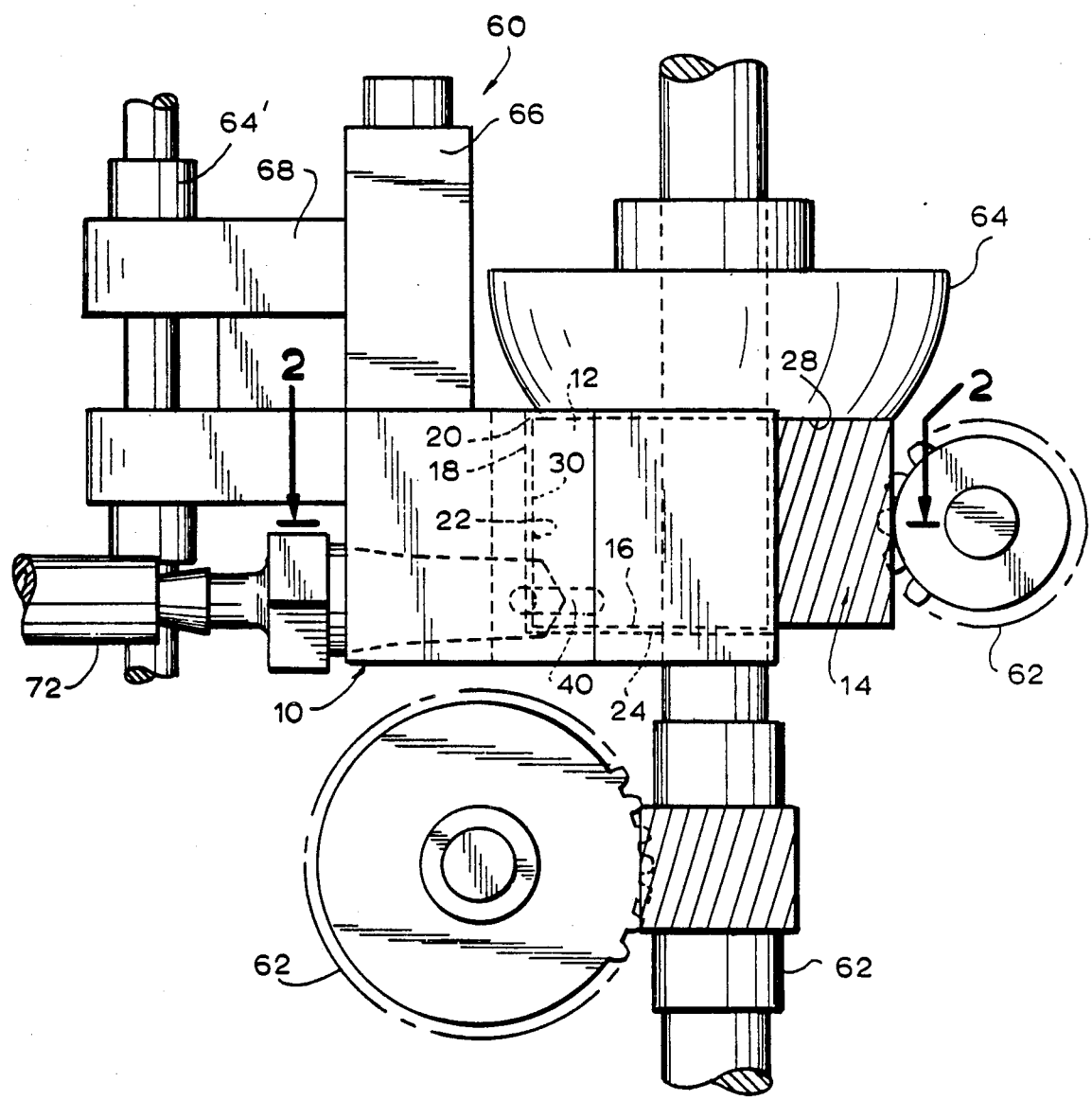
FIG. 1B is an enlarged fragmentary side elevational view of a gear equipped with a positive lubrication delivery system.
Figure 2:
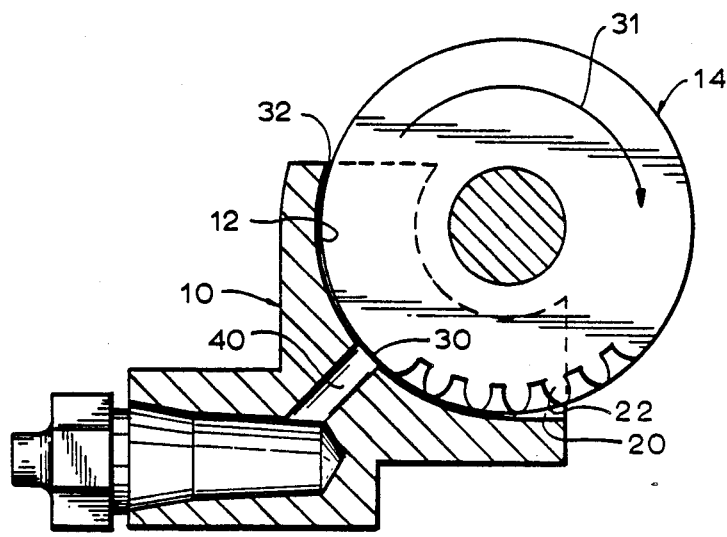
FIG. 2 is a sectional view taken along the line 2—2 of FIG. 1B.
Figure 3:
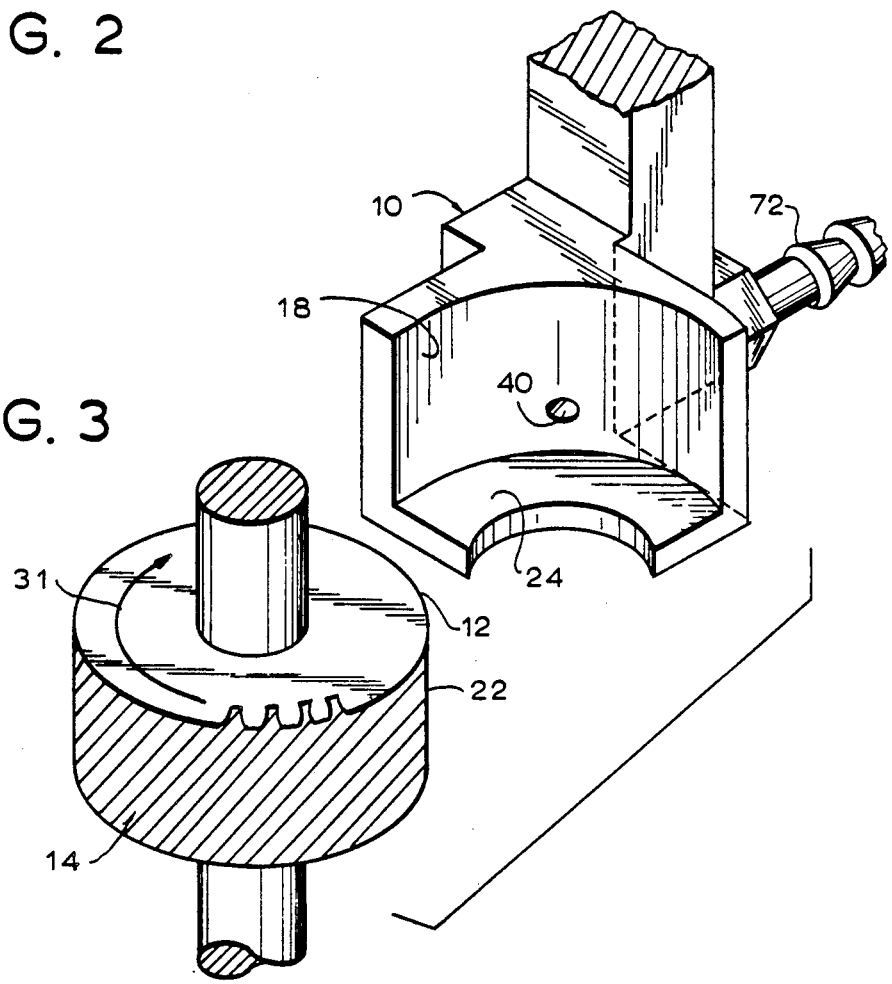
FIG. 3 is an exploded isometric view of a positive lubrication delivery system.
Figure 5:
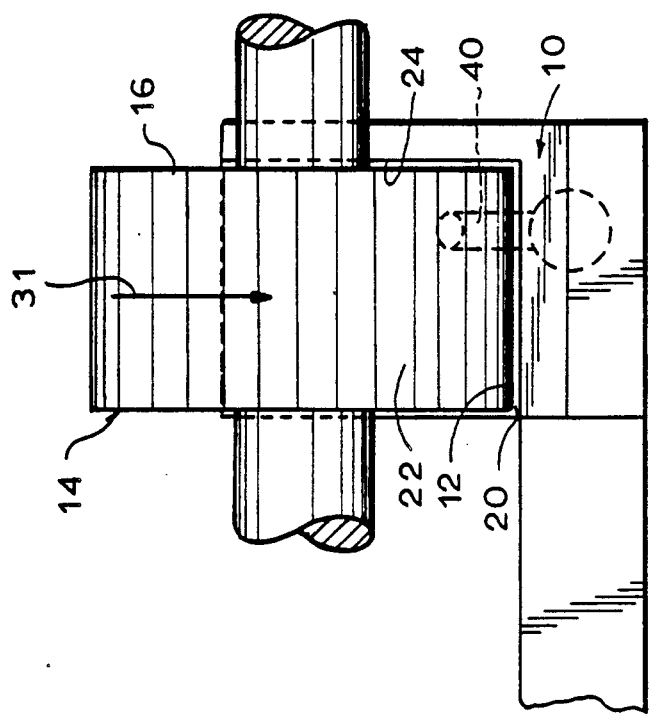
FIG. 5 is an end elevational view taken along the line 5—5 of FIG. 4.
Figure 4:
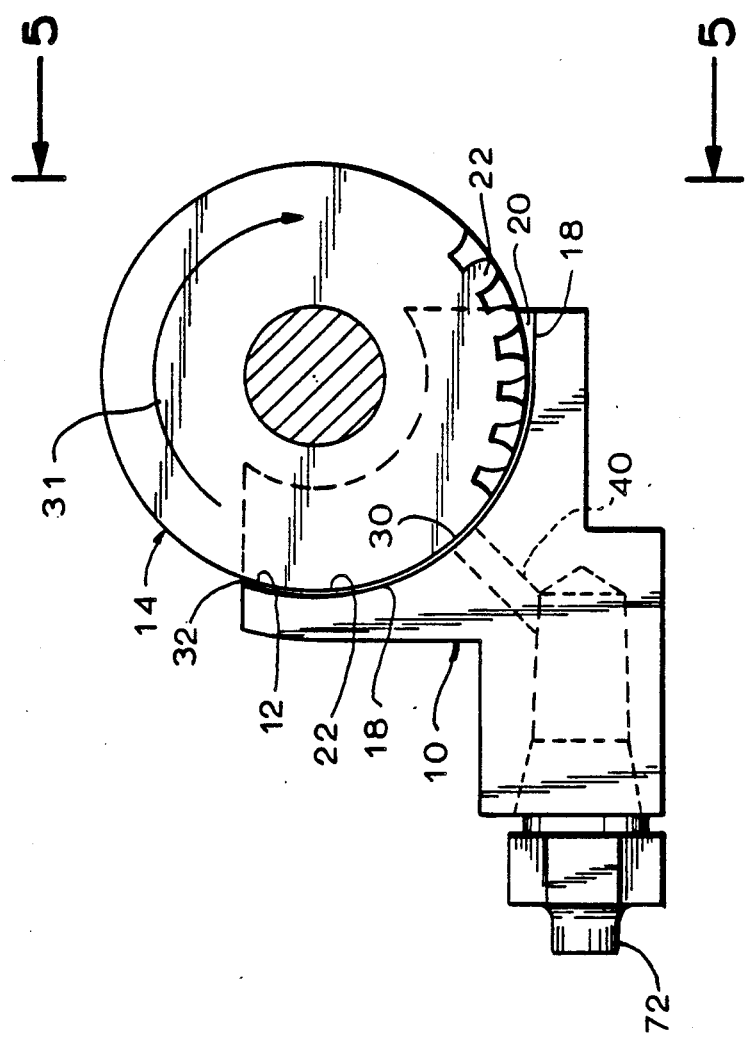
FIG. 4 is a side elevation view thereof.

Referring now to the drawing and in particular to FIGS. 2-4 thereof, the positive lubrication delivery system of the present invention comprises in its basic form a stationary shroud generally designated by the reference numeral 10 The shroud 10 is configured and dimensioned to encompass a segment 12 of the rotatable member generally designated 14 to be lubricated. The rotatable member 14 is or includes a gear, typically a worm gear including angled teeth defining an circumferential outer surface 22 thereof. The shroud 10 includes an arcuate surface 18 which defines, with the opposed rotatable member segment 12, a channel 20 intermediate the circumferential outer surface 22 of the rotatable member segment 12 and the adjacent arcuate surface 18 of the shroud 10. The circumferential extent of the rotatable member segment 12 covered by the shroud 10 preferably extends over at least about a quarter of the circumferential extent of the rotatable member 14, although somewhat lesser extensions are also operable. The shroud 10 additionally includes a planar surface 24 tranverse to the arcuate surface 18 and extending over an end portion 16 of the rotatable member 14, so that lubricant introduced into the channel 20 is confined there between the planar surface 24 of the shroud 10 and the wall or other surface 28 (see FIG. 1B) from which the rotatable member 14 projects.

It is a critical feature of the present invention that the channel 20 be of diminishing clearance in the direction of rotation of the rotatable member 14 Thus the channel is configured and dimensioned such that lubricant introduced in sufficient quantity adjacent the channel segment of maximum clearance 30, regardless of whether the rotatable member is rotating at the time of delivery, is caused to travel along the channel in the direction of normal rotation of the rotatable member (see arrow 31) toward a channel segment of minimum clearance 32 during normal rotatation of the rotatable member 14. (It will be appreciated that the term "normal" rotation is used to signify the normal or customary rotation of the rotatable member as opposed to what would be a special or unusual rotation in the opposite direction, such as might occur if a motion picture projector were run in reverse.) Lubricant introduced into the channel while the rotatable member is not rotating will substantially remain there until the rotatable member commences rotation, at which point it will be spread along the channel by the normal rotation. Preferably the clearance provided by the channel diminishes at a substantial constant rate, although the rate may vary if desired. While the optimum maximum and minimum channel clearances 30, 32 depend upon various factors, such as the viscosity of the lubricant, the speed of rotation of the rotatable member, and the like, a maximum clearance of 0.07 inch and a minimum clearance of 0.02 inch is generally preferred for the lubricant and gear speeds generally found in commercial motion picture projectors. For normal clearances, depending upon factors such as those enumerated above, a maximum/minimum clearance ratio of about 3-4 is Preferred, although it will be appreciated that, when very high maximum clearances are employed, the effective maximum clearance may be much less than the actual measured maximum clearance.

It will be appreciated that, for the purposes of the present specification and claims, the "maximum clearance" 30 of the channel 20 refers to the clearance along the length of the channel where the lubricant is introduced into the channel. The length of the channel 20 extending away from the point of maximum clearance 30 as so defined, in the direction of the reverse rotation of the rotatable member (that is, the direction of rotation opposite the normal rotation), has no significant desirable effect on the spread of the lubricant introduced at the point of maximum clearance 30 over the circumferential outer surface 22 of the rotatable member segment 12 in response to its normal rotation and is thus not pertinent to the present invention. If the rotatable member 14 is to be frequently rotated in the reverse direction of rotation, however, the shroud 10 may be configured and dimensioned to provide, with the rotatable member segment 12, a channel have a sinusoidally varying clearance with the point of maximum clearance 30 being located intermediate the ends and a point of minimum clearance 32 being disposed at each end. In this manner lubricant produced into the channel at the point of maximum clearance 30 intermediate the ends thereof will be spread over the circumferential outer surface of the rotatable member upon rotation of the rotatable member, regardless of the initial direction of rotation of the rotatable member subsequent to the introduction of lubricant into the channel at the point of maximum clearance 30.

A preferred lubricant for use in commercial motion picture film projectors is the silicone lubricating oil with a lithium soap thickener added available under the tradename Dow Corning #44. This synthetic high temperature bearing grease has a penetration of 240-280 mm (ASTM D217, worked 60 strokes) and a medium consistency of NLGI #2, and is suitable for use with combination gears, such as those formed by a fiber or plastic gear in combination with a hard steel gear.

The shroud 10 defines an aperture or passageway 40 terminating in shroud arcuate surface 18 through which the lubricant may be introduced into the channel 20, the aperture 40 preferably extending along an axis at a normal angle to the circumferential outer surface 22 of the rotatable member segment 12—that is, along a radius of the rotatable member 14. If desired, however, the aperture 40 may be tilted in the direction of rotation of the rotatable member so that the lubricant is introduced into the channel with a vector component in the direction of normal rotation of the rotatable member. The lubricant may even be introduced with a vector component in the direction of reverse rotation of the rotatable member, but possibly with less satisfactory results.

The shroud is formed of a material resistant to the intended lubricant as well as the anticipated operational temperatures to be encountered. Additionally, the shroud must be relatively rigid and non-deformable under the anticipated operating pressures so that the channel maintains the desired clearances. While a variety of different metal and plastics are suitable for this purpose, a preferred material is polycarbonate.

Figure 1A:
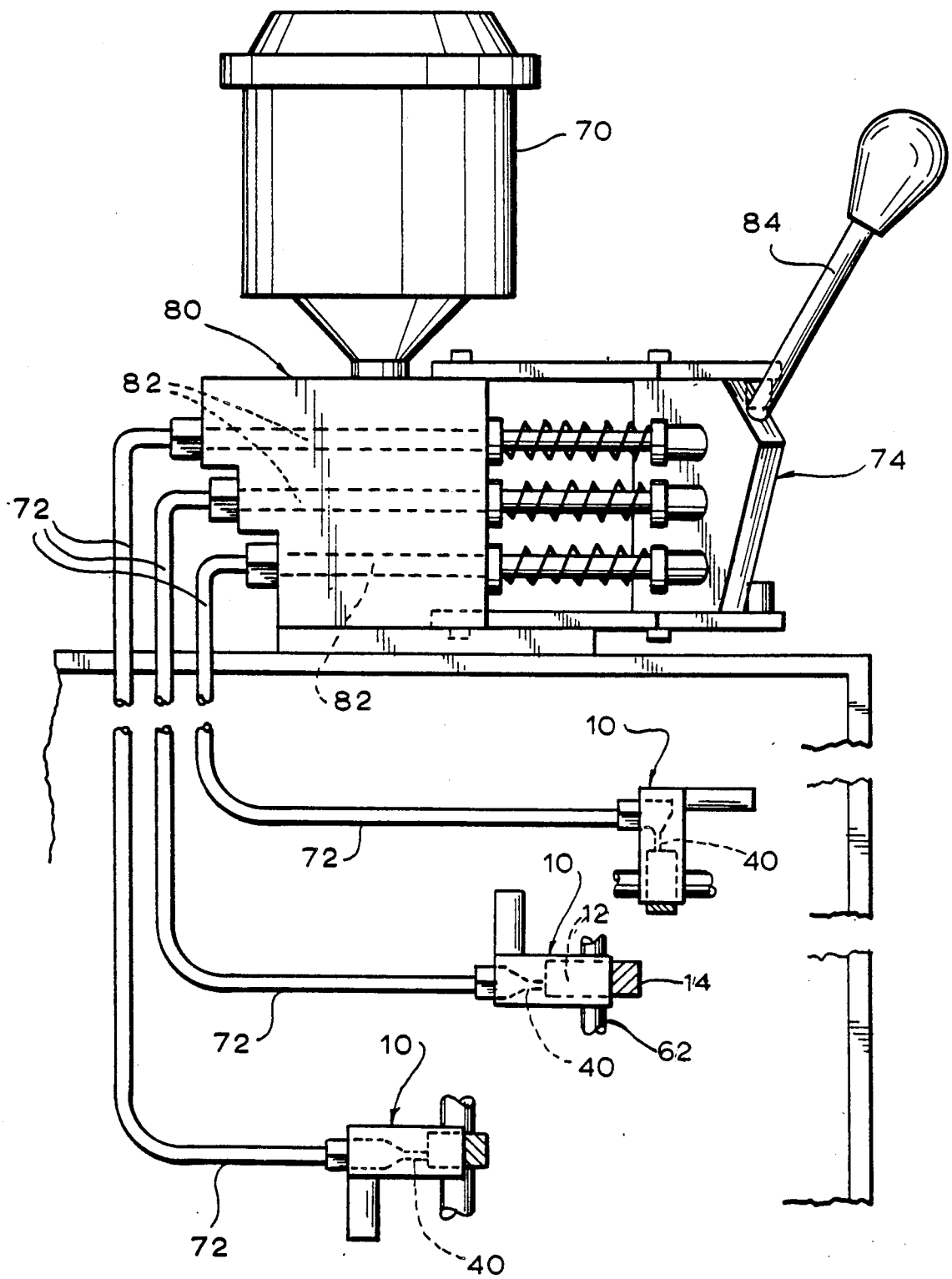
FIG. 1A is a fragmentary side elevational view of a motion picture projector equipped with a positive lubrication delivery system according to the present invention.

Referring now to FIGS. 1A and 1B, therein illustrated fragmentarily is a motion film projector generally designated 60 including a plurality of rotatable members 62 and stationary members 64, the former being rotatably mounted on the housing (not shown) of the projector and the latter being fixedly or non-rotatably mounted on the housing. As illustrated, one of the rotatable members 62 is the rotatable member 14 to be lubricated, the rotatable member 14 being disposed intermediate the planar surface 24 of a stationary shroud 10 and the opposed surface of a stationary member 64. The shroud 10 is simply mounted on one of the stationary members 64' in appropriate relative disposition to a rotatable member 14, for example, by means of a shoulder 66 and flange 68 mounted on stationary member 64'.

In order to introduce lubricant into channel 20 through the shroud aperture 40, the lubrication delivery system of the present invention preferably additionally includes a source 70 of lubricant, means 72 operatively secured at one end to the source 70 and at the other end to the shroud 10 for transporting lubricant from the source 70 to the shroud aperture 40 (and hence to the channel 20 adjacent the point of maximum clearance 30), and means generally designated 74 for intermittently manually actuating the lubricant transporting means 72. More particularly, the motion picture projector 60 includes a plurality of rotatable members 62, a plurality of shrouds 10, one shroud 10 for each rotatable member 14 to be lubricated, and a like plurality of lubricant transporting means 72 such as flexible plastic tubes. Each of the shrouds 10 is disposed adjacent one of the rotatable members 14 to define one of the channels 20. Each of the lubricant transporting means 72 is operatively secured to and in liquid communication with, at one end, the vented source 70 of lubricant and, at the other end, a respective one of the shroud apertures 40. Preferably the lubricant transporting means 72 is removably secured at each end to facilitate replacement in the event that it becomes clogged, develops leaks or the like.

The means 74 for manually actuating the lubricant transporting means 72 preferably includes a multichamber pump generally designated 80, with each chamber 82 of the multichamber pump 80 being gravity fed with lubricant by the vented source 70 thereabove, and a single spring-biased actuator lever 84 moving a piston axially in each chamber 82 (to the left as shown in FIG. 1A), thereby to force lubricant simultaneously from each chamber 82 of the multichamber pump 80 along a respective lubricant transport means 72 and hence into a respective shroud aperture 40 and channel 20. Upon release of the actuator lever 84, it automatically returns to its original position, creating a slight vacuum in each chamber 82 to assist the gravity feed of a new supply of lubricant thereinto from the source 70.

Now that the preferred embodiments of the present invention have been shown and described in detail, various modifications and improvements thereon will become readily apparent to those skilled in the art. Accordingly, the appended claims are to be construed broadly and in a manner consistent with the spirit and scope of the invention described herein.

I claim:

1. A positive lubrication delivery system for lubricating a rotatable member, comprising
    (A) a rotatable member in the form of a gear with teeth defining a circumferential outer surface of said rotatable member; and
    (B) a stationary shroud means configured and dimensioned to encompass a segment of said rotatable member to be lubricated and to define with said rotatable member along said segment, intermediate the circumferential outer surface of said segment and the adjacent surface of said shroud means, a channel of diminishing clearance in the direction of rotation of said rotatable member, said channel extending about at least one-eighth of the circumferential length of said segment from the point of maximum clearance to the point of minimum clearance, said clearance diminishing at a substantially constant rate from a maximum clearance at least three times the minimum clearance, said channel being configured and dimensioned such that lubricant introduced into said channel in sufficient quantity adjacent the point of maximum clearance, regardless of whether said rotatable member is rotating at the time of delivery, is confined and subsequently caused to travel along said channel in the direction of normal rotation of said rotatable member toward the point of minimum clearance during normal rotation of said rotatable member and be spread over said teeth in response to rotation of said rotatable member.

2. The lubrication delivery system of claim 1 additionally including a source of lubricant, means secured at one end to said source and at the other end to said shroud means for transporting lubricant from said source to said channel adjacent the point of maximum clearance, and means for manually actuating said lubricant transporting means.

3. The lubrication delivery system of claim 2 wherein said source is a source of lubricant having a penetration viscosity of 240–280 mm.

4. The lubrication delivery system of claim 1 wherein said channel provides a maximum clearance of 0.07 inch and a minimum clearance of 0.02 inch.

5. The lubrication delivery system of claim 1 wherein said lubricant introduced into said channel is introduced at an angle normal to the direction of rotation of the rotatable member.

6. The lubrication delivery system of claim 1 wherein said shroud means includes an arcuate surface adjacent the circumferential outer surface of the rotatable member and at least one surface transverse to the arcuate surface and extending over a respective end portion of the rotatable member.

7. The lubrication delivery system of claim 1 wherein said transverse surface is planar.

8. In combination, a motion picture projector including a plurality of rotatable members and the lubrication delivery system of claim 3 including a plurality of said shroud means and a like plurality of said lubricant transporting means, each of said shroud means being disposed adjacent one of said rotatable members to define one of said channels, and each of said lubricant transporting means being operatively secured at one end to a respective one of said shroud means and at the other end to said source.

9. A positive lubrication delivery system for lubricating a plurality of rotatable members, comprising
    (A) A plurality of rotatable members, each including a gear with teeth defining the circumferential outer surface of said rotatable member;
    (B) for each of said rotatable members, a stationary shroud means configured and dimensioned to encompass a segment of said rotatable member to be lubricated and to define with said rotatable member along said segment, intermediate said circumferential outer surface of said segment and the adjacent surface of said shroud means, a channel of diminishing clearance in the direction of rotation of said rotatable member, said channel extending about at least one-eighth of the circumferential length of said segment from the point of maximum clearance to the point of minimum clearance, said channel affording a clearance diminishing at a substantially constant rate from a maximum clearance to a minimum clearance no greater than one third of the maximum clearance, said channel being configured and dimensioned such that lubricant introduced into said channel in sufficient quantity adjacent the point of maximum clearance, regardless of whether said rotatable member is rotating at the time of delivery, is confined and subsequently caused to travel along said channel in the direction of normal rotation of said rotatable member toward the point of minimum clearance during normal rotation of said rotatable member, said shroud means including an arcuate surface adjacent said circumferential outer surface of said rotatable member and at least one surface transverse to said arcuate surface and extending over a respective end portion of said rotatable member;

(C) a source of lubricant;

(D) a plurality of means, each secured at one end to said source and at the other end to a respective one of said shroud means, for transporting lubricant from said source to said channel adjacent the point of maximum clearance and introducing it into said channel at an angle normal to the direction of rotation of said rotatable member associated with said respective shroud means, said lubricant transport means including a multichambered pump, with each chamber of said multichambered pump being fed with lubricant by said source; and (E) means for manually actuating said lubricant transporting means, said actuating means comprising a single actuator lever for driving lubricant simultaneously from each chamber of said multichambered pump into a respective channel;

whereby lubricant introduced into each of said channels is confined and subsequently caused to be spaced over said teeth of said respective rotatable member in response to its rotation.

* * * * *